US008736613B2

(12) United States Patent
Harden et al.

(10) Patent No.: US 8,736,613 B2
(45) Date of Patent: May 27, 2014

(54) SIMPLIFIED GRAPHICAL ANALYSIS OF MULTIPLE DATA SERIES

(75) Inventors: Arron J. Harden, Emberton (GB); Alex Swain, Austin, TX (US); Julian J. Vizor, Milton Keynes (GB)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 13/287,940

(22) Filed: Nov. 2, 2011

(65) Prior Publication Data

US 2013/0106861 A1  May 2, 2013

(51) Int. Cl.
*G06T 11/20* (2006.01)

(52) U.S. Cl.
USPC .......................................................... 345/440

(58) Field of Classification Search
USPC ............................................. 345/440–440.2
See application file for complete search history.

(56) References Cited

U.S. PATENT DOCUMENTS

| 5,371,842 | A  | * | 12/1994 | Easton et al. ................. 345/440 |
| 7,103,843 | B2 |   | 9/2006  | Hand et al. |
| 7,248,263 | B2 |   | 7/2007  | Freeman et al. |
| 7,460,123 | B1 |   | 12/2008 | Hull |
| 2008/0195430 | A1 | | 8/2008 | Rustagi et al. |
| 2009/0100086 | A1 | | 4/2009 | Dumant et al. |
| 2009/0147024 | A1 | * | 6/2009 | Sadler ........................... 345/629 |

OTHER PUBLICATIONS

Atluri, A., "Integrating a Data Quality Module into an ETL Process", MS Project/Thesis Proposal, Rochester Institute of Technology, Mar. 2, 2011, 15 pp.
Preliminary Amendment, Jul. 2, 2012, for U.S. Appl. No. 13/540,167, filed on Jul. 2, 2012 by A.J. Harden et al., Total 6 pp. [54.72C1 (PrelimAmend)].
U.S. Patent Application with U.S. Appl. No. 13/540,167, filed Jul. 2, 2012, entitled "Simplified Graphical Analysis of Multiple Data Series", invented by Harden, A.J., A. Swain, and J.J. Vizor, Total 28 pp. [54.72C1 (Appln)].
Office Action, dated May 2, 2013, for U.S. Appl. No. 13/540,167, filed Jul. 2, 2012, entitled, "Simplified Graphical Analysis of Multiple Data Series", invented by Arron J. Harden et I., pp. 1- 20.
Response to Final Office Action, dated Aug. 2, 2013, for U.S. Appl. No. 13/540,167, filed Jul. 2, 2012, entitled, "Simplified Graphical Analysis of Multiple Data Series", invented by Arron J. Harden et I., pp. 1-8.
Final Office Action, dated Oct. 10, 2013, for U.S. Appl. No. 13/540,167, filed Jul. 2, 2012, entitled, "Simplified Graphical Analysis of Multiple Data Series", invented by Aaron J. Harden et al., pp. 1-11. (54.72C1).

(Continued)

*Primary Examiner* — Xiao Wu
*Assistant Examiner* — Charles Tseng
(74) *Attorney, Agent, or Firm* — Janaki K. Davda; Konrad, Raynes, Davda and Victor LLP

(57) ABSTRACT

Provided are a computer implemented method, computer program product, and system for presenting information about multiple data series. The multiple data series are obtained. A main graphing area with a graph showing one or more of the obtained data series, an active process execution metrics area with information about the one or more obtained data series shown in the graph, and an available process execution metrics area with one or more thumbnail views of one or more of the obtained data series available for selection to be shown in the graph are displayed.

14 Claims, 7 Drawing Sheets

(56) References Cited

OTHER PUBLICATIONS

Response to Final Office Action, dated Dec. 9, 2013, for U.S. Appl. No. 13/540,167, filed Jul. 2, 2012, entitled, "Simplified Graphical Analysis of Multiple Data Series", invented by Aaron J. Harden et al., pp. 1-4. (54.72C1).

Notice of Allowance, dated Jan. 8, 2014, for U.S. Appl. No. 13/540,167 (54.72C1), filed Jul. 2, 2012, entitled, "Simplified Graphical Analysis of Multiple Data Series", invented by Aaron J. Harden et al., pp. 1-11.

* cited by examiner

SIMPLIFIED GRAPHICAL ANALYSIS OF MULTIPLE DATA SERIES

BACKGROUND

Embodiments of the invention relate to simplified graphical analysis of multiple data series.

Extract, Transformation and Load (ETL) processes are often executed on a repeating basis, where a particular ETL process is executed in a runtime environment, which is shared with many other system resource-intensive activities. Given varying system load, the ETL user may want to monitor variances across a range of ETL process runtime metrics (i.e., "data series" in graphing terms) to identify performance problems or bottlenecks caused by overloaded system resources and/or by other causes.

Herein, the terms "metric/data series" may be used. Both "metric" and "data series" describe a measurement that may be used to gauge some quantifiable component of performance of an ETL process, but "data series" may be described as a set of data for this measurement that may be used to create a graph.

A typical ETL process may utilize a range of system resources, including varying aspects of: Central Processing Unit (CPU), memory, disk Input/Output (I/O), and disk space. In addition, various metrics/data series related to the performance of the ETL process itself are of interest, including, but not limited to: total data rows processed (Total Rows); total number of rows processed on the input (Rows In); total number of rows processed on the output (Rows Out) and an indication of current performance (Rows per second). The measurements of systems resources used by the ETL process and related to the performance of the ETL process may be described as current metrics/data series for a particular measurement of an Extract, Transformation, Load (ETL) process.

In order to monitor variances in these repeating process executions, the ETL user may want to compare and analyze the ETL process execution related metrics/data series across two or more executions of a given ETL process. Moreover, the ETL user may want to carry out this comparison and analysis via a Web 2.0 based User Interface (UI) hosted on a remote computer via a client session. Analysis may be done by creating graphs of each specific metric/data series for each of the ETL process executions, so that the ETL user can see the variance in the metric/data series over time.

With traditional graphing tools, graphs can be displayed for different metrics/data series in an overlay. Graphical User Interface (GUI) buttons may be used to select/deselect metrics/data series for display in a composite (overlay) graph. The user activates a metric/data series for display in order to get an indication of the metric/data series performance.

Thus, there can be numerous metrics/data series involved when analyzing a typical ETL process execution. When large numbers of metrics/data series are presented using traditional graphing tools, the graphical view presented to the user may be congested. Similarly, adding increasing numbers of metrics/data series to a graph can result in a congested graphical view. In such congested graphical views, it may be difficult to differentiate one metrics/data series from another.

Traditional graphing tools enable simplifying the graphing view by removing metrics/data series from being included in the graph. However, once a metric/data series is removed from the graph, the user then loses a graphical view on that removed metric/data series.

SUMMARY

Provided are a computer implemented method, computer program product, and system for presenting information about multiple data series. The multiple data series are obtained. A main graphing area with a graph showing one or more of the obtained data series, an active process execution metrics area with information about the one or more obtained data series shown in the graph, and an available process execution metrics area with one or more thumbnail views of one or more of the obtained data series available for selection to be shown in the graph are displayed.

BRIEF DESCRIPTION OF THE SEVERAL VIEWS OF THE DRAWINGS

Referring now to the drawings in which like reference numbers represent corresponding parts throughout:

FIG. 5 is formed by FIGS. 5A and 5B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
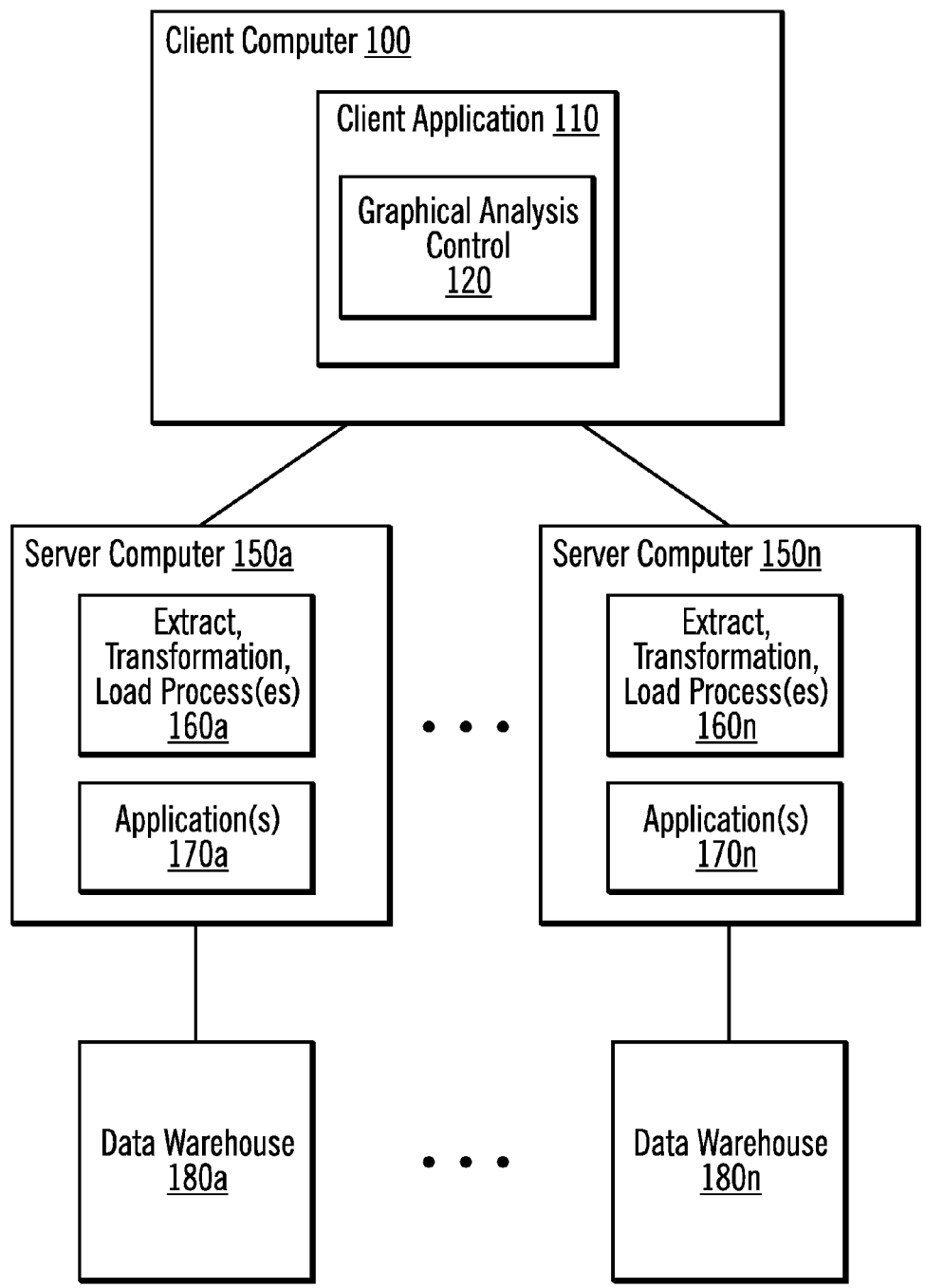
FIG. 1 illustrates, in a block diagram, a computer environment in accordance with certain embodiments.

FIG. 1 illustrates, in a block diagram, a computer environment in accordance with certain embodiments. In FIG. 1, a client computer 100 is coupled to one or more server computers 150*a* . . . 150*n* (where the ellipses indicate that there may be any number of server computers). The client computer 100 includes a client application 110, which presents a graphical analysis control 120.

Each server computer 150*a* . . . 150*n* includes one or more extract, transform, load processes 160*a* . . . 160*n* and one or more applications 170*a* . . . 170*n*. The applications 170*a* . . . 170*n* may include ETL applications. Each server computer 150*a* . . . 150*n* may run different applications 170*a* . . . 170*n*, which may lead to different metrics/data series on each server computer 150*a* . . . 150*n*. Also, server computer 150*a* . . . 150*n* is coupled to a data warehouse 180 . . . 180*n* (where the ellipses indicate that there may be any number of data warehouses).

In certain embodiments, the client application 110 provides a custom graphical analysis control 120, which combines a traditional main graphing area with a number of thumbnail views related to each metric/data series being monitored. In certain embodiments, the graphical analysis control 120 is a Web 2.0 UI control. The user is able to select specific metrics/data series for inclusion in the main graphing area, via the thumbnail view. There are thumbnail views visible for all available metrics. These thumbnail views show the actual profile of the live metric/data series, not a static representation, therefore, enabling the user to easily get an "at a glance" view of the profile of the comparison for each specific metric/data series, without having to add the metric/data series to the main graph. A live thumbnail view may be described as representing real-time metrics/data series data (i.e., current or dynamic data at a point in time). In certain embodiments, as the metrics change in real-time, the thumbnail views change in real-time. This will also aid the user in identifying the metrics/data series to select for detailed analysis via the main graph, as all comparative graph profiles are viewable at the same time. The graphical analysis control 120 reduces the complexity caused by "congestion" when adding multiple data series to a graphing view and will enable a large amount of comparison data to be represented within the confines of a limited dimension (e.g., where size is limited by screen real estate).

An ETL application 170a . . . 170n captures and maintains metrics/data series related to the execution of ETL processes 160a . . . 160n for presentation on-demand to the client computer 100. The client application 110 presents the graphical analysis control 120. In certain embodiments, the client computer 100 is a remote client hosting a Web 2.0 based UI, and the client application 110 is a Web 2.0 client application. In certain embodiments, the graphical analysis control 120 may be described as a multi-faceted graphing control, implemented as a custom UI control.

Figure 2:
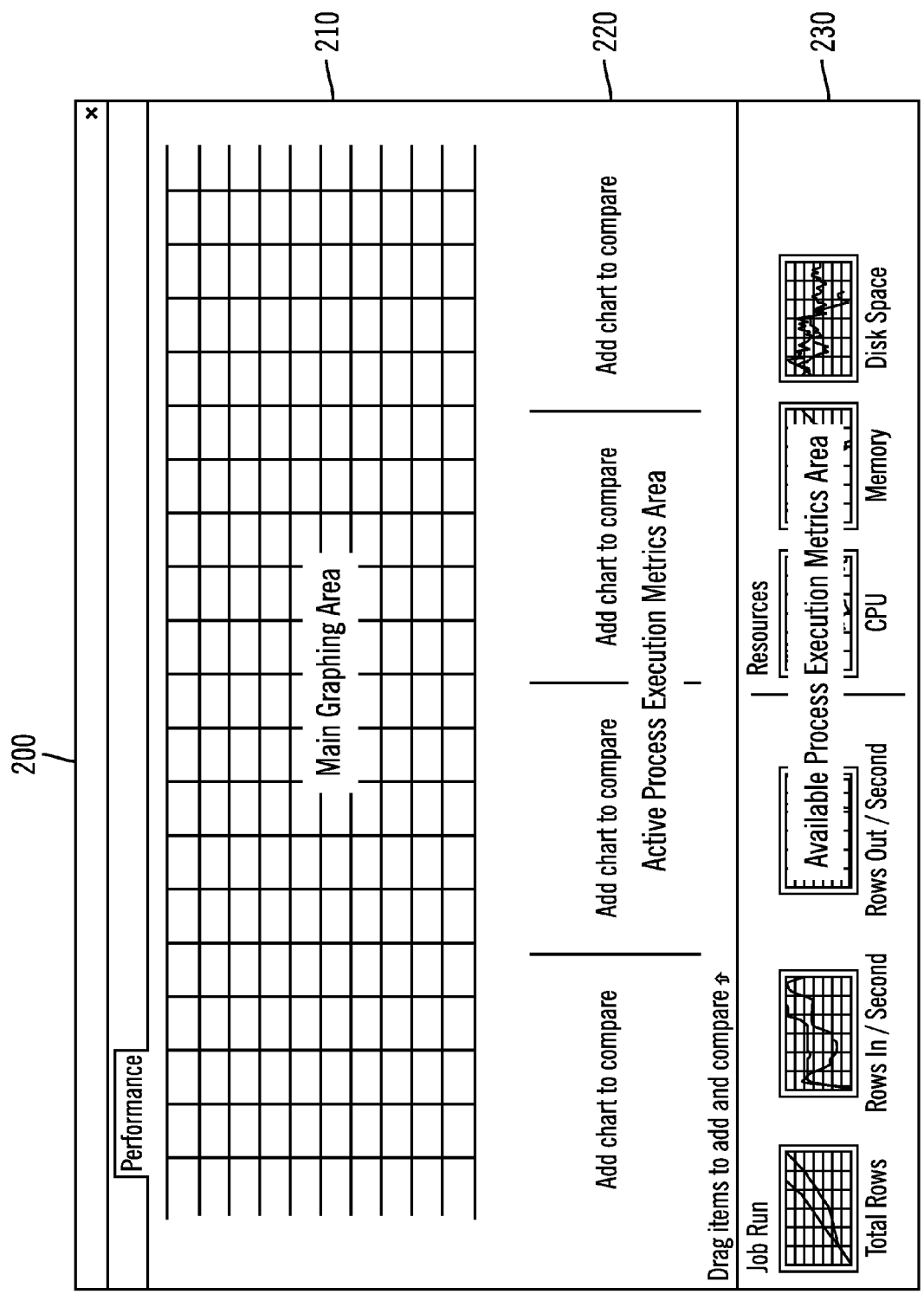
FIG. 2 illustrates a layout of a graphical analysis control in accordance with certain embodiments.

FIG. 2 illustrates a layout of a graphical analysis control 200 in accordance with certain embodiments. The graphical analysis control 200 includes three functional areas: a main graphing area 210, an active process execution metrics area 220, and an available process execution metrics area 230.

The main graphing area 210 shows multiple data series related to a number of user-selected ETL process execution metrics, for two or more ETL process executions. The main graphing area 210 is used for detailed comparison of the selected one or more metrics for the ETL process executions, with appropriate scale shown on the x- and y-axes.

The active process execution metrics area 220 shows a key (e.g., line style) for each current, user-selected metric/data series represented in the main graphing area 210 and shows details related to that metric/data series.

The available process execution metrics area 230 shows one or more live thumbnail views. The thumbnail views may be described as comparison graphs of each available ETL process execution metric. In certain embodiments, the thumbnail views are selectable via drag/drop gestures.

In certain embodiments, the graphical analysis control 120 instantiates with a default selection of the "Total Rows" metric/data series represented on a graph in the main graphing area 210 for comparison of ETL process executions. In certain embodiments, the user may set one or more default metrics/data series to be shown in a graph initially. The ETL user sees the graph of Total Rows metric/data series for each ETL process execution and may analyze the differences between the graph profiles.

The active process execution metrics area 220 shows details of the line style used to depict the "Total Rows" metric/data series and specific details relevant to the "Total Rows" metric/data series. The active process execution metrics area 220 displays a variable number of metrics/data series and scales to fit the available screen space.

The available process execution metrics area 230 presents to the user each of the available ETL process execution metrics/data series for two or more ETL process executions, as a comparison graph, presented as a thumbnail view. The available process execution metrics area 230 displays a variable number of metrics/data series and scales to fit the available screen space.

These thumbnail views show the actual profile of the live metric/data series, not a static representation, therefore, enabling the user to easily get an "at a glance" view of the profile of the comparison for each specific metric/data series, without having to add the metric/data series to the main graphing area 210. This will also aid the user in identifying the metrics/data series to select for detailed analysis in the main graphing area 210, as all comparative graph profiles are viewable at the same time.

The ETL user may add graphs from the available process execution metrics area 230 to the active process execution metrics area 220 for display in the main graphing area 230 for a more detailed comparison/analysis of any given metric. To avoid congestion in the main graphing area 210, previously selected metrics/data series may be removed, while the live thumbnail view for all metrics/data series are still shown in the available process execution metrics area 230. This will give the user a complete view of all available ETL process execution metrics/data series for the comparative ETL process executions, in a single custom UI control.

Figure 3:
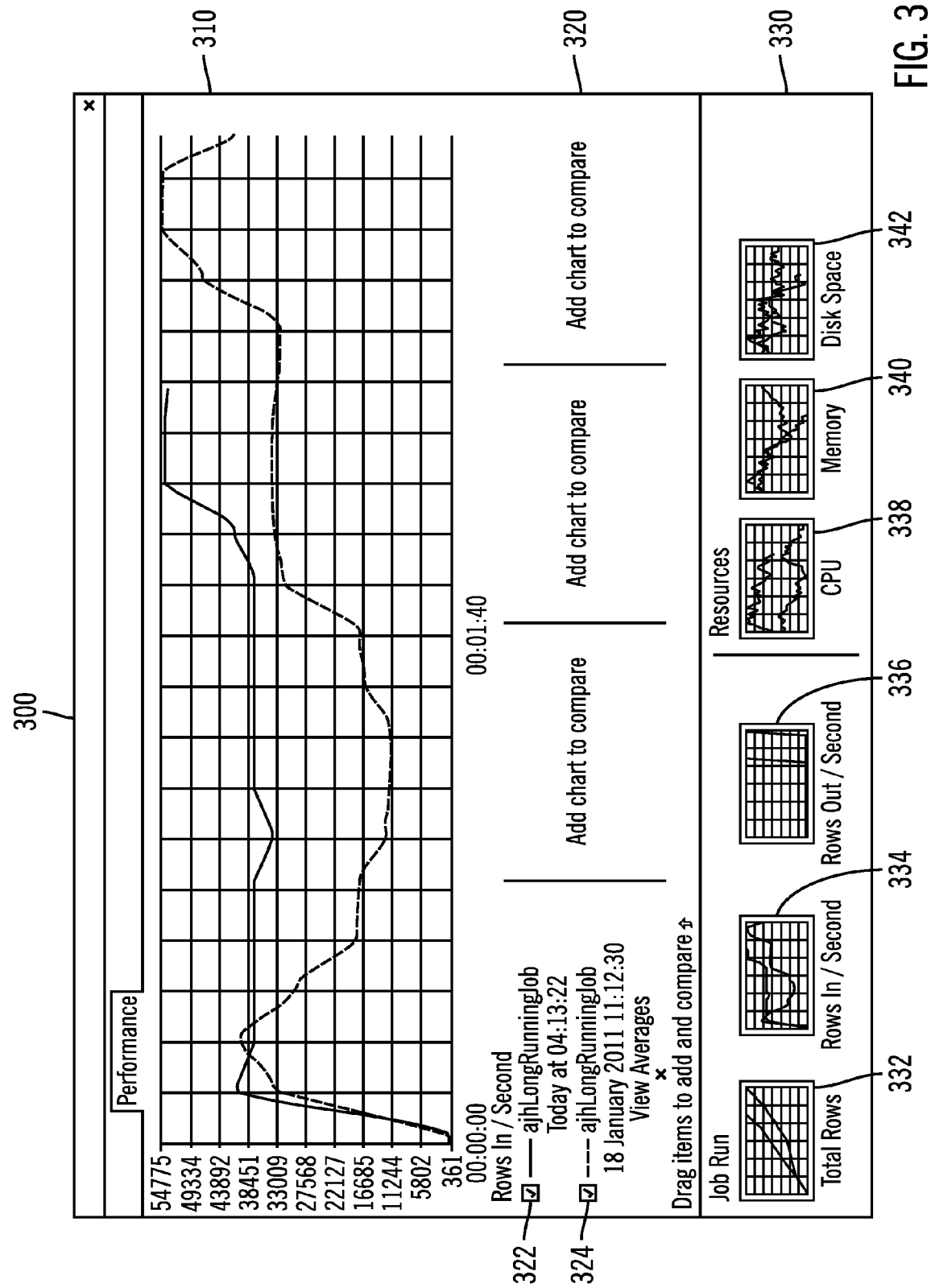
FIG. 3 illustrates an example graphical analysis control with a selected metric/data series and live thumbnail views in accordance with certain embodiments.

FIG. 3 illustrates an example graphical analysis control 300 with a selected metric/data series and live thumbnail views in accordance with certain embodiments. The graphical analysis control 300 includes three functional areas: a main graphing area 310, an active process execution metrics area 320, and an available process execution metrics area 330.

In FIG. 3, the graphical analysis control 300 shows a single metric/data series in the main graphing area 310 for the "Rows In/Second" metric/data series 334, from two comparative ETL process executions 322, 324. The ETL user can also see the comparative profiles of other metrics/data series via the live thumbnail views presented in the available process execution metrics area 230. The other metrics/data series include: "Total Rows" 332, "Rows Out/Second" 336, "CPU" 338, "Memory" 340, and "Disk Space" 342. In certain embodiments, when a metric/data series is selected from the available process execution metrics area 330, the selected metric/data series is displayed in a manner indicating the selection (e.g., the selected metric/data series is "grayed out" or shown in a light shade of gray). For the example of FIG. 3, the "Rows In/Second" metric/data series 334 may be displayed as "grayed out" in the available process execution metrics area 330.

Figure 4:
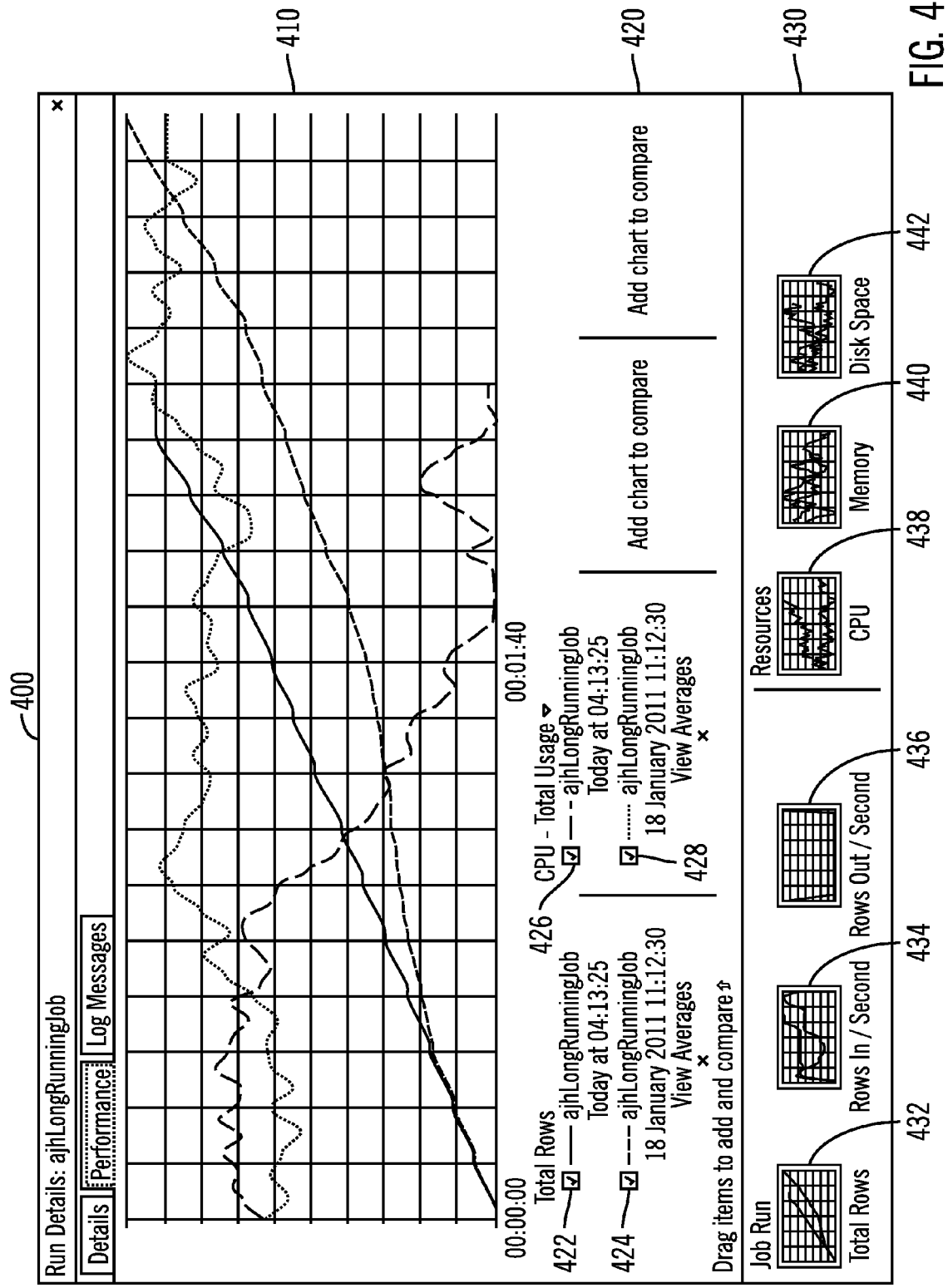
FIG. 4 illustrates an example graphical analysis control with multiple selected metrics/data series and live thumbnail views in accordance with certain embodiments.

FIG. 4 illustrates an example graphical analysis control 400 with multiple selected metrics/data series and live thumbnail views in accordance with certain embodiments. The graphical analysis control 400 includes three functional areas: a main graphing area 410, an active process execution metrics area 420, and an available process execution metrics area 430.

In FIG. 4, the graphical analysis control 400 shows two metrics/data series in the main graphing area 410 for the "Total Rows" metric/data series 432 and the "CPU" metric/data series 438, from two comparative ETL process executions 422, 424 for the "Total Rows" metric/data series 432 and two comparative ETL process executions 426, 428 for the CPU" metric/data series 438. The ETL user can also see the comparative profiles of other metrics/data series via the live thumbnail views presented in the available process execution metrics area 230. The other metrics/data series include: "Rows In/Second" 434, "Rows Out/Second" 436, "Memory" 440, and "Disk Space" 442.

Figure 5A:
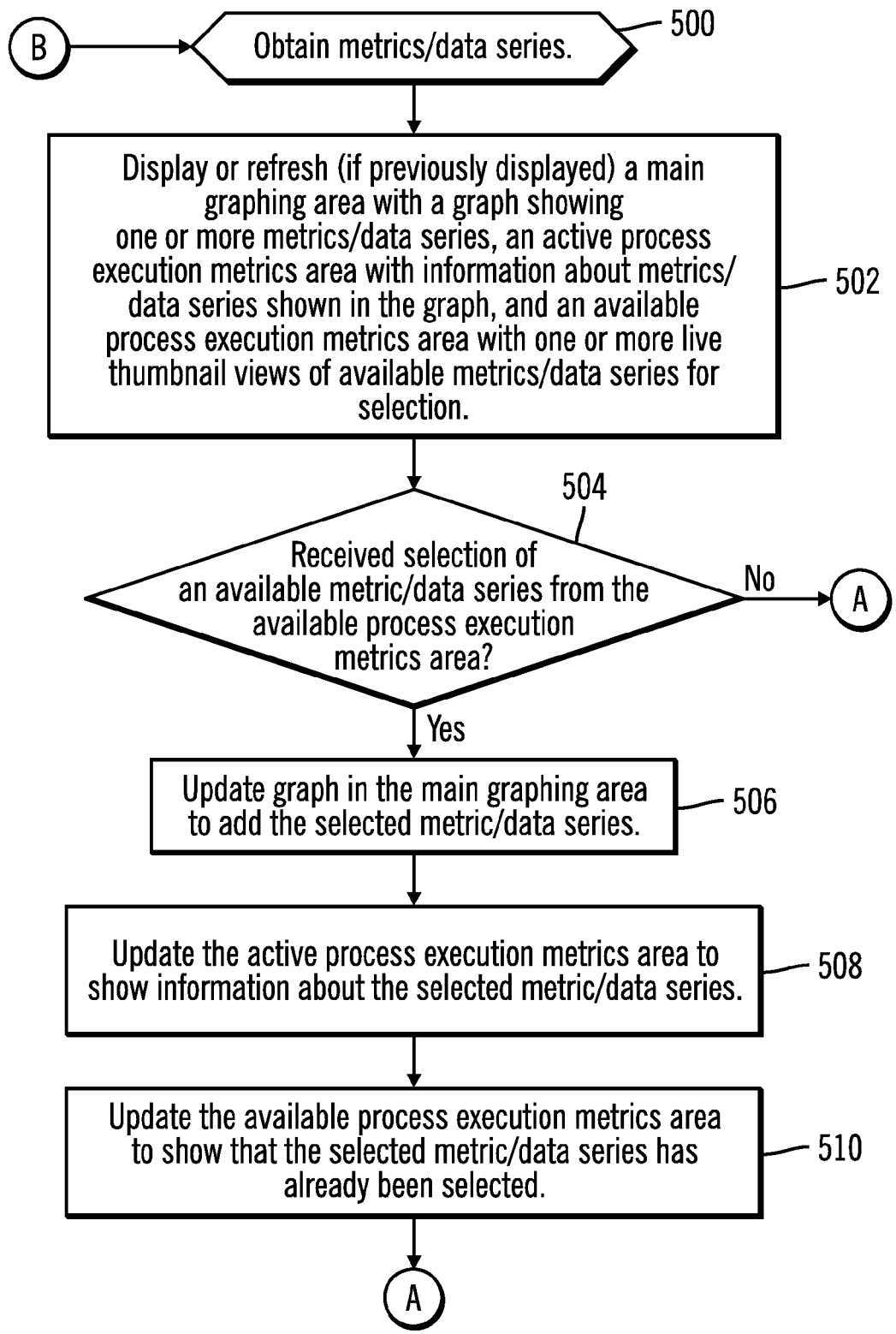
FIG. 5 illustrates, in a flow diagram, logic performed by the graphical analysis control 120 in accordance with certain embodiments.
Figure 5B:
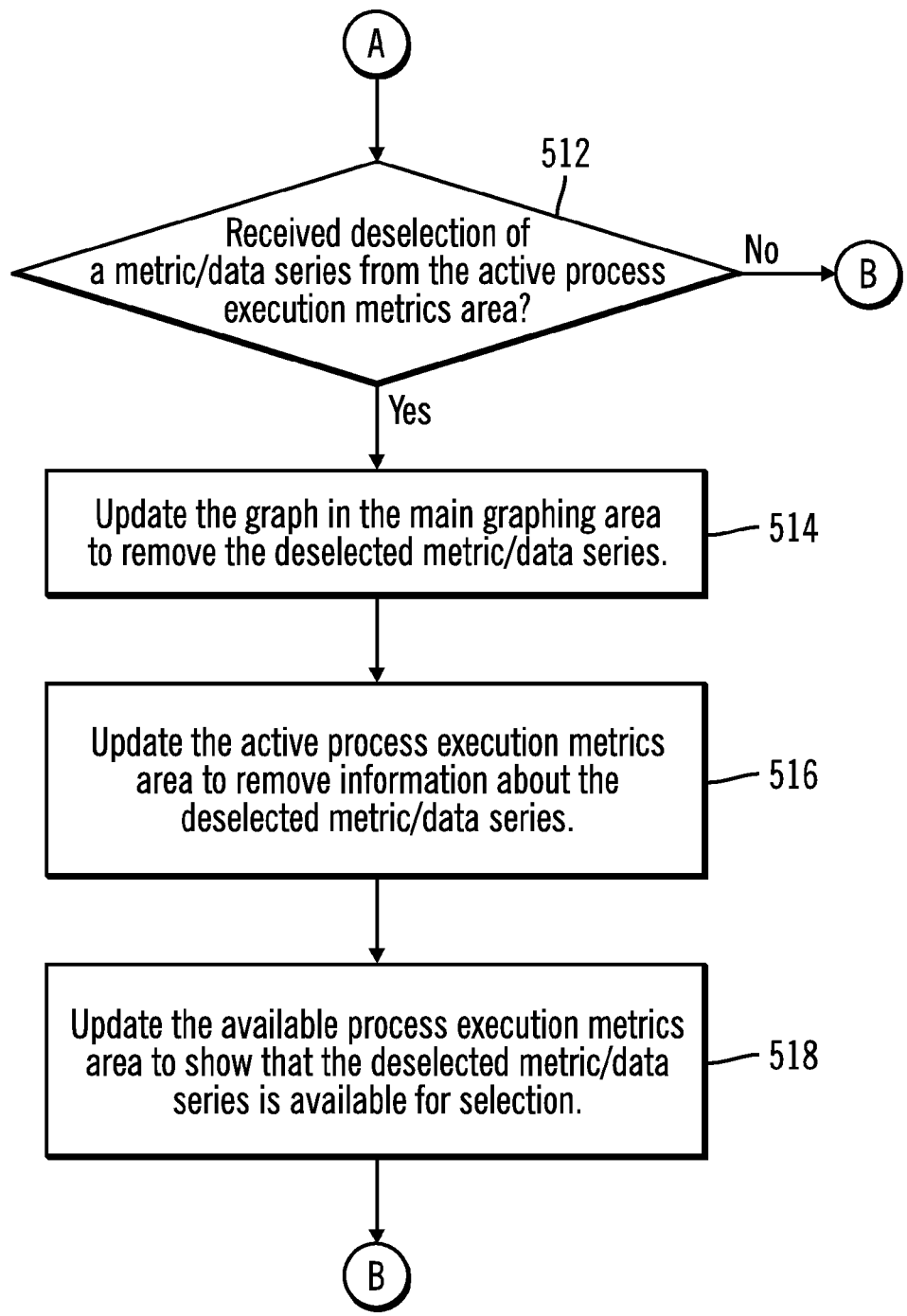

FIG. 5 illustrates, in a flow diagram, logic performed by the graphical analysis control 120 in accordance with certain embodiments. FIG. 5 is formed by FIGS. 5A and 5B. In FIG. 5, control begins at block 500 with the graphical analysis control 120 obtaining metrics/data series. In certain embodiments, the client application 110 obtains the metrics/data series from the applications 170a . . . 170n for use by the graphical analysis control 120.

In block 502, the graphical analysis control 120 displays or refreshes (if previously displayed) a main graphing area with a graph showing one or more metrics/data series, an active process execution metrics area with information about metrics/data series shown in the graph, and an available process execution metrics area with one or more live thumbnail views of available metrics/data series for selection. In certain embodiments, the one or more metrics/data series are default metrics/data series.

In block 504, the graphical analysis control 120 determines whether selection of an available metric/data series from the available process execution metrics area has been received. If so, processing continues to block 506, otherwise, processing continues to block 512 (FIG. 5B).

In block 506, the graphical analysis control 120 updates the graph in the main graphing area to add the selected metric/data series. One or more default and/or previously selected metrics/data series may already be shown in the graph, and the newly selected metric/data series is added to the graph in addition to the previously selected metrics/data series.

In block 508, the graphical analysis control 120 updates the active process execution metrics area to show information about the selected metric/data series.

In block 510, the graphical analysis control 120 updates the available process execution metrics area to show that the selected metric/data series has already been selected. For example, the selected metric/data series may be shown as "grayed out". From block 510 (FIG. 5A), processing continues to block 512 (FIG. 5B).

In block 512, the graphical analysis control 120 determines whether deselection of a metric/data series from the active process execution metrics area has been received. If so, processing continues to block 514, otherwise, processing continues to block 500 (FIG. 5A) so that a "refresh" of the data series can occur.

Thus, in certain embodiments, the flow of processing of FIGS. 5A and 5B will repeat/loop in order to get up-to-date data about each metric/data series, to support the live aspect of the thumbnail representations in that they may change over time (e.g. if the ETL process execution is still in progress).

Merely to enhance understanding of embodiments, FIG. 5 illustrates looping between selection, deselection, and obtaining current (i.e., live) metrics/data series however, embodiments also enable a user to terminate the looping and perform other operations.

In block 514, the graphical analysis control 120 updates the graph in the main graphing area to remove deselected metric/data series. One or more default and/or previously selected metrics/data series may already be shown in the graph, and the previously selected metrics/data series continue to be shown in the graph when the deselected metric/data series is removed.

In block 516, the graphical analysis control 120 updates the active process execution metrics area to remove information about the deselected metric/data series.

In block 518, the graphical analysis control 120 updates the available process execution metrics area to show that the deselected metric/data series is available for selection. For example, if the metric/data series had been grayed out, the deselected metric/data series is shown without the graying (e.g., shown as originally displayed at the time of selection to be included in the graph). From block 518 (FIG. 5B), processing continues to block 500 (FIG. 5A) so that a "refresh" of the data series can occur.

Thus, the graphical analysis control 120 shows live data in thumbnail views. The graphical analysis control 120 presents information for multiple, varying metrics/data series in graphs. The graphical analysis control 120 creates thumbnail views for each metric, and each of the thumbnail views illustrates the actual metric/data series performance of a particular metric/data series as a graph. These thumbnail views may be selected and deselected for display on the composite (overlay) graph. In this way, the user is able to gain insight into each metric/data series before (or without) the metric/data series being displayed on the composite (overlay) graph.

The graphical analysis control 120 enables the ETL user to have visibility of the comparison graph profile for each metric/data series and to see the data for all metrics/data series at any one time. The graphical analysis control 120 presents a large number of different data series related to numerous metrics, for two or more ETL process executions, in an understandable way within a UI frame of limited visible dimension (e.g., where size is limited by screen real estate). The graphical analysis control 120 enables a view on all metrics/data series at all times.

The graphical analysis control 120 provides simplified graphical analysis of multiple data series/ETL process runtime metrics. The graphical analysis control 120 combines a traditional main graphing area with a number of thumbnail views related to each metric/data series. The graphical analysis control 120 enables selecting/deselecting specific metrics/data series for inclusion in the main graphing area via the thumbnail view (where the thumbnail views are visible for all available metrics/data series). The graphical analysis control 120 also enables identifying the metrics/data series to select for detailed analysis via the main graphing area.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 6:
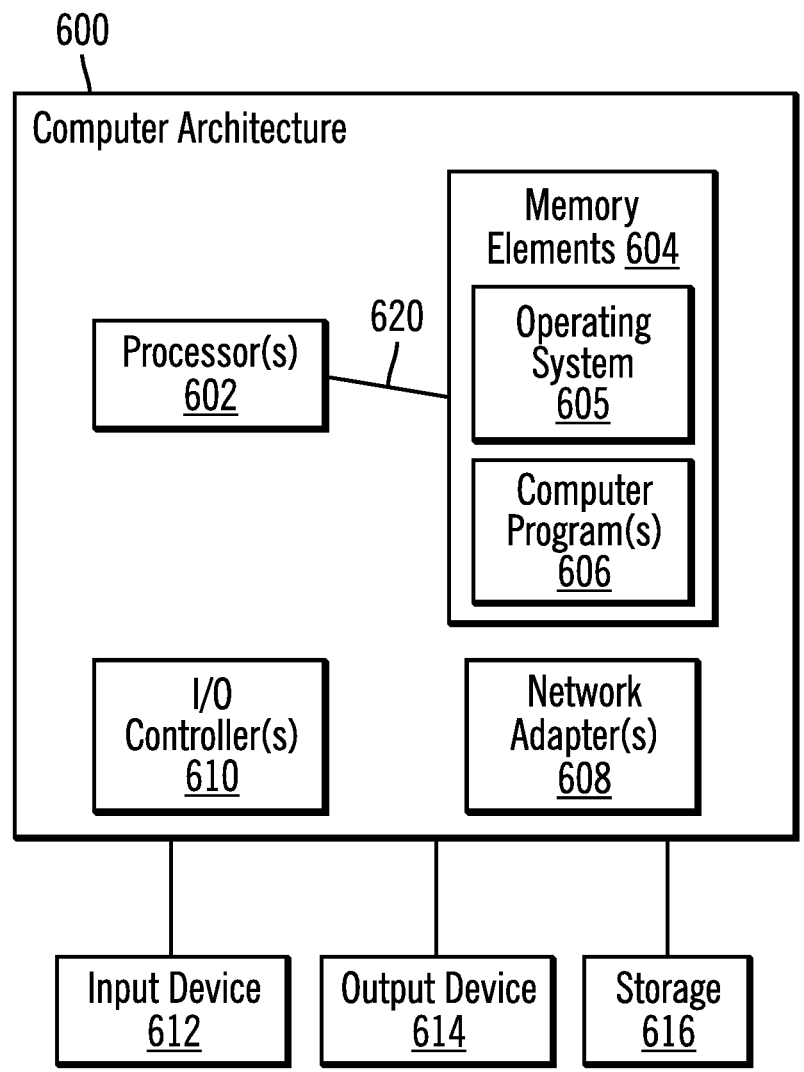
FIG. 6 illustrates, in a block diagram, a computer architecture that may be used in accordance with certain embodiments.

FIG. 6 illustrates a computer architecture 600 that may be used in accordance with certain embodiments. Client computer 100 and/or one or more server computers 150a . . . 150n may implement computer architecture 600. The computer architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The computer architecture 600 may be coupled to storage 616 (e.g., any type of storage device, including a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The computer architecture 600 may include fewer components than illustrated, additional components not illustrated herein, or some combination of the components illustrated and additional components. The computer architecture 600 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer program product for presenting information about multiple data series, the computer program product comprising:
    a non-transitory computer readable storage medium having computer readable program code embodied therewith, wherein the computer readable program code, when executed by a processor of a computer, is configured to perform:
    obtaining the multiple data series;
    displaying a graphical analysis control that includes a main graphing area with a graph showing one or more of the obtained data series, an active process execution metrics area with details about each of the one or more obtained data series shown in the graph, and an available process execution metrics area with one or more thumbnail views, wherein each of the one or more thumbnail views represents a data series as a comparison graph of two or more process executions for selection to be shown in the graph; and
    in response to selection of a thumbnail view from the one or more thumbnail views in the available process execution metrics area, updating the active process execution metrics area to show details about a data series represented by the selected thumbnail view.

2. The computer program product of claim 1, wherein the one or more thumbnail views represent live data series for a particular measurement of an Extract, Transformation, Load (ETL) process.

3. The computer program product of claim 1, wherein the one or more thumbnail views each represent a comparison graph of an Extract, Transformation, Load (ETL) process execution measurement.

4. The computer program product of claim 1, wherein the main graphing area shows multiple, obtained data series related to user-selected Extract, Transformation, Load (ETL) process execution measurements for two or more corresponding ETL process executions.

5. The computer program product of claim 1, wherein the active process execution metrics area shows a line style for each obtained data series represented in the graph in the main graphing area and shows details related to that obtained data series.

6. The computer program product of claim 1, wherein the computer readable program code, when executed by the processor of the computer, is configured to perform:
    in response to the selection of the thumbnail view,
        updating the graph in the main graphing area to add the data series represented by the selected thumbnail view; and
        updating the available process execution metrics area to show that the data series represented by the selected thumbnail view has already been selected.

7. The computer program product of claim 1, wherein the computer readable program code, when executed by the processor of the computer, is configured to perform:
    determining whether deselection of an obtained data series from the active process execution metrics area has been received; and
    in response to determining that deselection of the obtained data series has been received,
        updating the graph in the main graphing area to remove the deselected data series;
        updating the active process execution metrics area to remove information about the deselected data series; and
        updating the available process execution metrics area to show that the deselected data series is available for selection.

8. A computer system for presenting information about multiple data series, comprising:
    a processor; and
    a storage device coupled to the processor, wherein the storage device has stored thereon a program, and wherein the processor is configured to execute instructions of the program to perform operations, wherein the operations comprise:
    obtaining the multiple data series;
    displaying a graphical analysis control that includes a main graphing area with a graph showing one or more of the obtained data series, an active process execution metrics area with details about each of the one or more obtained data series shown in the graph, and an available process execution metrics area with one or more thumbnail views, wherein each of the one or more thumbnail views represents a data series as a comparison graph of two or more process executions for selection to be shown in the graph; and in response to selection of a thumbnail view from the one or more thumbnail views in the available process execution metrics area, updating the active process execution metrics area to show details about a data series represented by the selected thumbnail view.

9. The computer system of claim 8, wherein the one or more thumbnail views represent live data series for a particular measurement of an Extract, Transformation, Load (ETL) process.

10. The computer system of claim 8, wherein the one or more thumbnail views each represent a comparison graph of an Extract, Transformation, Load (ETL) process execution measurement.

11. The computer system of claim 8, wherein the main graphing area shows multiple, obtained data series related to user-selected Extract, Transformation, Load (ETL) process execution measurements for two or more corresponding ETL process executions.

12. The computer system of claim 8, wherein the active process execution metrics area shows a line style for each obtained data series represented in the graph in the main graphing area and shows details related to that obtained data series.

13. The computer system of claim 8, wherein the operations further comprise:

in response to the selection of the thumbnail view,
updating the graph in the main graphing area to add the data series represented by the selected thumbnail view; and
updating the available process execution metrics area to show that the data series represented by the selected thumbnail view has already been selected.

14. The computer system of claim 8, wherein the operations further comprise:

determining whether deselection of an obtained data series from the active process execution metrics area has been received; and
in response to determining that deselection of the obtained data series has been received,
updating the graph in the main graphing area to remove the deselected data series;
updating the active process execution metrics area to remove information about the deselected data series; and
updating the available process execution metrics area to show that the deselected data series is available for selection.

\* \* \* \* \*